(12) United States Patent
Oughton, Jr. et al.

(10) Patent No.: US 6,348,782 B1
(45) Date of Patent: Feb. 19, 2002

(54) UNINTERRUPTIBLE POWER SUPPLY SYSTEMS, VOLTAGE REGULATORS AND OPERATING METHODS EMPLOYING CONTROLLED FERRORESONANT TRANSFORMER CIRCUITS

(75) Inventors: George W. Oughton, Jr., Raleigh; John Kyle Earle, Greenville, both of NC (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/165,859

(22) Filed: Oct. 2, 1998

(51) Int. Cl.$^7$ .................................................. G05F 1/13
(52) U.S. Cl. ........................ 323/284; 323/249; 323/301; 323/306; 323/310; 307/46
(58) Field of Search .......................... 363/75; 323/305, 323/306, 310, 248, 249, 254, 299, 301, 302; 307/43, 45, 46, 50, 51, 52, 64, 66

(56) References Cited

U.S. PATENT DOCUMENTS

| | | | |
|---|---|---|---|
| 3,590,362 A | 6/1971 | Kakalec | 321/45 R |
| 4,010,381 A | 3/1977 | Fickenscher et al. | 307/66 |
| 4,130,790 A | 12/1978 | Heisey | 323/60 |
| 4,313,060 A | 1/1982 | Fickenscher et al. | 307/23 |
| 4,353,014 A | 10/1982 | Willis | 315/411 |
| 4,385,263 A | 5/1983 | Luz et al. | 315/411 |
| 4,475,047 A | 10/1984 | Ebert, Jr. | 307/66 |
| 4,656,412 A | 4/1987 | McLyman | 320/39 |
| 4,791,542 A | 12/1988 | Piaskowski | 363/17 |
| 4,916,329 A | * 4/1990 | Dang et al. | 307/66 |
| 5,483,463 A | 1/1996 | Qin et al. | 364/492 |
| 5,602,462 A | * 2/1997 | Stich et al. | 323/258 |
| 5,642,002 A | 6/1997 | Mekanik et al. | 307/64 |
| 5,739,595 A | 4/1998 | Mekanik et al. | 307/64 |
| 5,760,495 A | 6/1998 | Mekanik | 307/66 |

FOREIGN PATENT DOCUMENTS

| | | |
|---|---|---|
| EP | 0 284 541 A2 | 9/1988 |
| JP | 54082053 A | 6/1979 |
| JP | 55032133 A | 3/1980 |
| JP | 56050417 A | 5/1981 |
| JP | 56155420 A | 12/1981 |

OTHER PUBLICATIONS

McGraw–Hill Dictionary of Scientific and Technical Terms Fifth Edition, p. 745 and pp. 1696–1697, 1994.*
H.C. Gerdes et al., *A Practical Approach to Understanding Ferroresonance*, EEE–Circuit Design Engineering, pp. 87–89 Apr. 1966.

(List continued on next page.)

*Primary Examiner*—Peter S. Wong
*Assistant Examiner*—Gary L. Laxton
(74) *Attorney, Agent, or Firm*—Myers Bigel Sibley & Sajovec

(57) ABSTRACT

An uninterruptable power supply system for producing an AC voltage from at least one of a DC power source or an AC power source includes an input terminal configured to receive an AC voltage from an AC power source, and an inverter operative to produce an AC voltage at an output thereof from a DC power source. A ferroresonant transformer circuit includes a transformer having an input winding, a output winding, and a third winding that forms part of a resonant circuit that produces saturation in the output winding when an AC voltage on the input winding exceeds a predetermined amplitude. A transformer input control circuit is coupled to the input terminal and to the inverter output and is operative to couple at least one of the input terminal and the inverter output to the input winding. The transformer input control circuit variably couples the input terminal to the input winding responsive to at least one of a voltage at the input terminal, a current in the output winding, a voltage on the output winding and a current at the input terminal. Related voltage regulators and methods are also described.

61 Claims, 5 Drawing Sheets

OTHER PUBLICATIONS

Harry P. Hart et al., *The Derivation and Application of Design Equations for Ferroresonant Voltage Regulators and Regulated Rectifiers*, IEEE Transactions on Magnetics, vol. MAG–7, No. 1, Mar. 1971, pp. 205–211.

Robert J. Kakalec et al., *New Technology for Battery–Charging Rectifiers*, Bell Laboratories Record, May 1979, pp. 131–134.

Jefferson T. Mitchell et al., *Rectifiers and Energy Conservation*, Telecommunications, Mar. 1979, pp. 43–46.

Rex Teets, *Application and Design of Ferroresonant Transformers*, pp. 28–34 No Date.

*IEEE Standard for Ferroresonant Voltage Regulators*, Electronics Transformer Technical Committee of the IEEE Power Electronics Society, IEEE Std. 449–1990, May 16, 1990.

Nowak, Stewart, "Power Problems: Selecting a UPS," Electronics Test, Jul. 13, (1990), No. 7, San Francisco, CA, US.

International Search Report, PCT/US99/19677, Feb. 8, 2000.

* cited by examiner

UNINTERRUPTIBLE POWER SUPPLY SYSTEMS, VOLTAGE REGULATORS AND OPERATING METHODS EMPLOYING CONTROLLED FERRORESONANT TRANSFORMER CIRCUITS

FIELD OF THE INVENTION

The present invention relates to power supply systems and operating methods therefor, and more particularly, to uninterruptible power supply (UPS) Systems, voltage regulators and voltage regulation methods.

BACKGROUND OF THE INVENTION

Uninterruptible power supply (UPS) systems arc used in a wide variety of applications, such as for providing reliable and regulated AC power to computer systems, telecommunications switching equipment and cable television transmission equipment. Typical UPS systems include batteries, standalone generators or other alternate power sources that may be brought on-line should an AC utility source fail to meet predetermined voltage or other performance criteria, e.g., under "brownout" and "blackout" conditions. In addition, UPS systems commonly include power conditioning circuits that are designed to reduce spikes, frequency variations, voltage excursions and other irregularities that are often present on AC utility lines. Accordingly, AC voltage regulation is often a key function of a UPS system, an accordingly, most conventional UPS systems include some type of AC voltage regulation circuit.

A UPS voltage regulation circuit is often designed to meet the particular demands of the environment in which the UPS operates. For example, in cable television applications, UPS's are typically used to supply AC power for distribution over the cable network. As television signals tend to have much higher frequencies than the typical 60 Hz power signals used in a cable system, AC power signals are typically distributed on the coaxial cable itself, multiplexed with television signals, with units such as signal repeaters receiving power from the cable through the used of tuned tank circuits tied to the coaxial conductors. A single pole-mounted cable UPS system may supply a cable network including several such units distributed over multiple branches and large geographical areas.

Because of the widely distributed nature of typical cable television power systems, it is generally inconvenient to de-energize the entire network served by a UPS system when a portion of the network fails. Instead of turning off the UPS system, service personnel typically short out the coaxial conductors leading into a suspected failed portion of the network, replace suspected components, and then remove the short to see if the replacement remedies the failure. Because of this practice, and because of the likelihood of unintentional shorts due to falling tree branches and the like, it is generally desirable that cable television UPS systems exhibit good short circuit current limiting characteristics.

Other environmental factors affect the choice of voltage regulation techniques as well. For example, cable television and telephone systems are very susceptible to lightning and switching induced transients that can cause both short term and long term voltage surges that can damage equipment. Although line equipment typically includes short term voltage spike protection devices such as metal oxide varistors (MOV's), these devices generally are not very effective at suppressing longer term voltage excursions, e.g., multi-cycle voltage surges such as those caused by load shedding. Accordingly, it is also generally desirable for UPS systems serving such equipment to exhibit excellent surge suppression characteristics.

Several different types of AC voltage regulators have been used to meet UPS operational demands. Many UPS's employ self-regulating ferroresonant transformer regulators, which have long been used in telephony and similar systems because of their simplicity, ruggedness and desirable operating characteristics. Ferroresonant transformer regulators typically provide excellent voltage regulation, excellent output current limiting under fault conditions, and substantial surge suppression. However, ferroresonant transformer regulators also typically exhibit lower efficiency than comparable linear transformer regulators and tend to be susceptible to subharmonic overshoot and ringing when presented with load step changes and low frequency input discontinuities. Because of the presence of additional windings and the need for a relatively large resonating capacitor, ferroresonant transformer regulators also tend to have greater size and weight than linear transformer regulators of comparable power-handling capability, and thus tend to be more expensive.

Other conventional UPS's employ voltage regulators that utilize a linear transformer instead of a ferroresonant transformer, relying on additional control electronics to provide the desired regulation. Linear transformer regulators tend to have higher efficiency than comparable ferroresonant transformer regulators, and typically exhibit less overshoot and subharmonic ringing when perturbed by line or load discontinuities, but typically exhibit less than desirable surge suppression or current limiting characteristics.

SUMMARY OF THE INVENTION

In light of the foregoing, it is an object of the present invention to provide uninterruptible power supply (UPS) systems that can provide a desirable combination of regulation, efficiency, surge suppression, and short-circuit current limiting.

It is another object of the present invention to provide voltage regulators and methods of voltage regulation that can provide a desirable combination of regulation, efficiency, surge suppression, and short-circuit current limiting.

It is yet another object of the present invention to provide ferroresonant voltage regulators having desirable size and weight characteristics.

These and other objects, features and advantages are provided according to the present invention by voltage regulators, UPS's and voltage regulation methods in which an input terminal receiving an AC voltage, e.g., a utility AC voltage, is selectively coupled to an input winding of a ferroresonant transformer responsive to at least one of a voltage at the input terminal and a current in the output winding of the ferroresonant transformer. In preferred embodiments, a voltage per turn on the input winding is controlled by selectively connecting the input terminal of the voltage regulator to a location along the input winding, e.g., by tap changing via relays or other switching elements. Additional output control may be achieved by controlling the resonance of the ferroresonant circuit associated with the ferroresonant transformer, for example, by adding or removing, capacitance from the ferroresonant circuit.

The present invention arises from the realization that by regulating the voltage per turn on the input winding of a ferroresonant transformer regulator using, for example, relatively simple tap-changing techniques, the saturation characteristic of the ferroresonant transformer regulator circuit can be controlled to provide improved performance. Accordingly, the ferroresonant transformer regulator circuit may be designed to operate with less circulating current in its resonating circuit while obtaining many of the desirable characteristics of ferroresonant transformers, such as inherent surge suppression and current limiting. Reducing circulating current allows the size of the windings, capacitors and other components to be reduced, and can lead to increased efficiency. UPS operation can be achieved by switching the input winding of the ferroresonant transformer between an AC power source and a battery-powered inverter, or by coupling the AC power source and the inverter to respective first and second input windings of the ferroresonant transformer.

In particular, according to the present invention, an uninterruptible power supply system for producing an AC voltage from at least one of a DC power source or an AC power source includes an input terminal configured to receive an AC voltage from an AC power source, and an inverter operative to produce an AC voltage, preferably regulated, at an output thereof. A ferroresonant transformer circuit includes a transformer having an input winding, an output winding, and a third winding that forms part of a resonant circuit that produces saturation in the output winding when an AC voltage on the input winding exceeds a predetermined amplitude. A transformer input control circuit is coupled to the input terminal and to the inverter output and is operative to couple at least one of the input terminal and the inverter output to the input winding. The transformer input control circuit variably couples the input terminal to the input winding responsive to at least one of a voltage at the input terminal, a current in the output winding, a voltage on the output winding and a current at the input terminal.

According to aspects of the present invention, the transformer input control circuit is operative to increase a voltage per turn on the input winding responsive to at least one of an increase in a current in the output winding, a decrease in a voltage at the input terminal, and a decrease in a voltage on the output winding, and to decrease a voltage per turn on the input winding responsive to at least one of a decrease in a current in the output winding, an increase in a voltage at the input terminal, and an increase in a voltage on the output winding. The transformer input control circuit may be operative to increase a voltage per turn on the input winding responsive to a current in the output winding increasing above a first predetermined threshold and to decrease a voltage per turn on the input winding responsive to a current in the output winding falling below a second predetermined threshold. The transformer input control circuit may also be operative to decrease a voltage per turn on the input winding responsive to a voltage at the input terminal increasing above a first predetermined threshold and to increase a voltage per turn on the input winding responsive to a voltage at the input terminal falling below a second predetermined threshold. The transformer input control circuit may also be operative to decrease a voltage per turn on the input winding responsive to a voltage on the output winding increasing above a first predetermined threshold and to increase a voltage per turn on the input winding responsive to a voltage on the output winding falling below a second predetermined threshold.

In embodiments according to the present invention, the transformer input control circuit is operative to connect the input terminal to the input winding, at a location along the input winding selected responsive to at least one of a voltage at the input terminal, a current in the output winding, a voltage on the output winding and a current at the input terminal. For example, the input winding may have a plurality of taps, with the transformer input control circuit being operative to connect the input terminal to a selected one of the plurality of taps responsive to at least one of a voltage at the input terminal, a current in the output winding, a voltage on the output winding, and a current at the input terminal.

In other embodiments according to the present invention, the system may further comprise a resonance control circuit coupled to the third winding and operative to control a resonance of the resonant circuit to thereby control a saturation characteristic of the output winding. The resonance control circuit may comprise means for increasing and decreasing capacitance in the resonant circuit.

A voltage regulator according to the present invention comprises an input terminal configured to receive an input AC voltage, and a ferroresonant transformer circuit including a transformer having a input winding, a output winding, and a third winding that forms part of a resonant circuit that produces saturation in the output winding when an AC voltage on the input winding exceeds a predetermined amplitude. A transformer input control circuit is coupled to the input terminal and operative to variably couple the input terminal to the input winding responsive to an operating parameter of the voltage regulator, such as a voltage at the input terminal, a current in the output winding, a voltage on the output winding, and a current at the input terminal.

According to method aspects of the present invention, an AC voltage source is variably coupled to the input winding of a ferroresonant transformer circuit responsive to an operating characteristic of the ferroresonant transformer circuit, such as a voltage at the AC voltage source, a current in the output winding of the ferroresonant transformer circuit, a voltage on the output winding, and a current at the AC voltage source. The AC voltage source may be variably coupled to the input winding by connecting an input terminal connected to the AC voltage source to the input winding at a selected location along the input winding, e.g., at a selected one of a plurality of taps. To provide further control, a resonance of the resonant circuit of the ferroresonant transformer circuit may be varied to thereby control a saturation characteristic of the output winding.

DETAILED DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
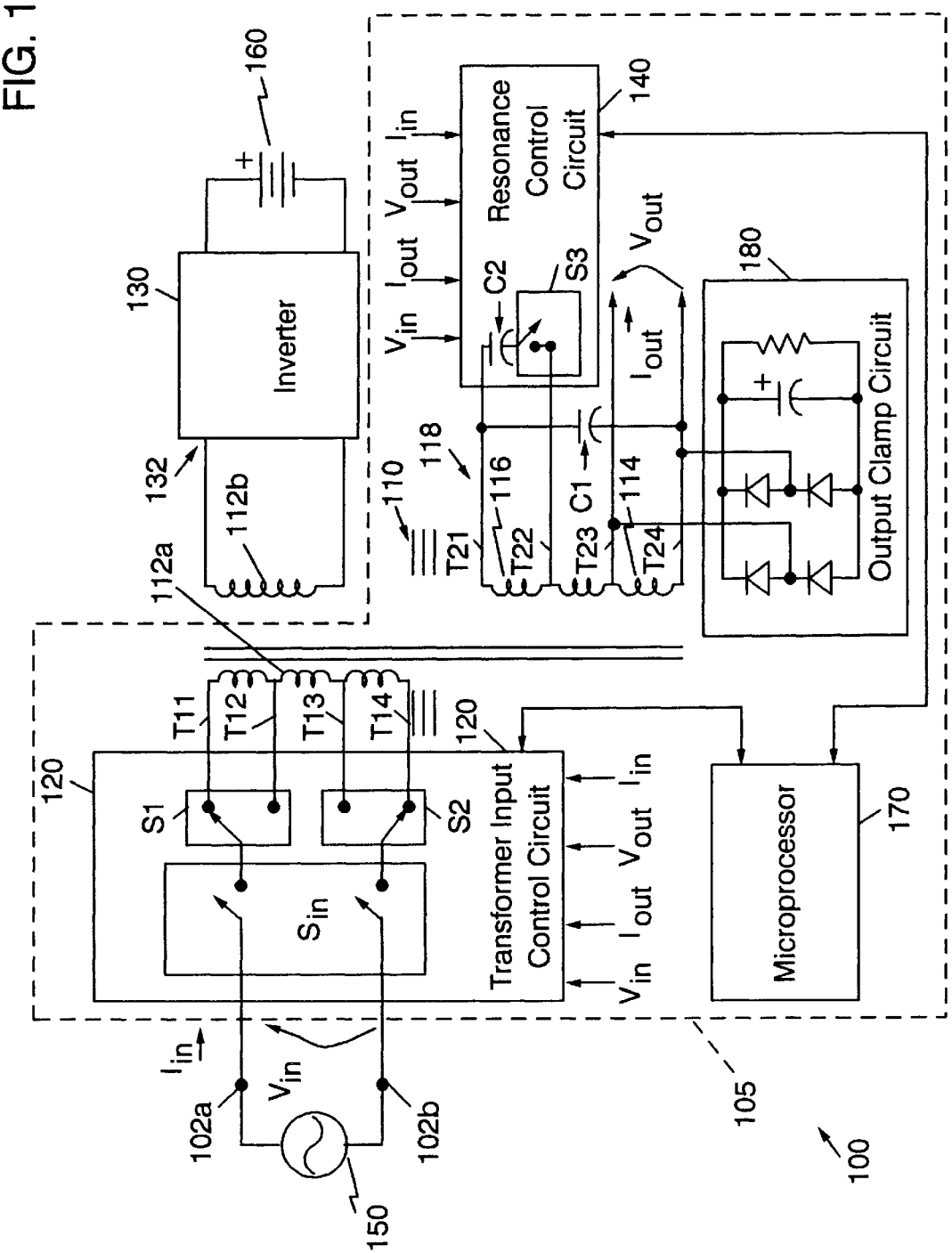
FIG. 1 illustrates a first uninterruptible power supply (UPS) system embodiment of the present invention.

Referring to FIG. 1, an uninterruptible power supply (UPS) system 100 in an embodiment of the present invention includes a ferroresonant transformer 110 including a first input winding 112a having taps T11, T12, T13, T14 at spaced apart locations thereon, a second input winding 112b, and an output winding 114. A third winding 116 forms part of a resonant circuit 118 including a capacitor C1. The resonant circuit 118 produces saturation in the output winding 114 when a voltage on at least one of the input windings 112a, 112b exceeds a predetermined threshold.

Operational principles of ferroresonant transformer circuits are well-known to those skilled in the art. Those skilled in the art will appreciate, for example, that the output winding 114 and the third winding 116 may have one of a number of configurations. For example, the resonant third winding 116 may be configured such that the resonant circuit is separate from the output winding 114. Alternatively, as illustrated, the resonant circuit 118 may include the output winding 114, with the output voltage of the ferroresonant transformer 110 being produced between taps T23, T24 of the resonant winding 116. Those skilled in the art will also appreciate that the resonant circuit 118 may include reactive components other than or in addition to the capacitor C1 connected as shown, such as capacitors connected in different ways, or inductors or other reactive components. Ferroresonant transformer circuits are generally described in *IEEE Standard for Ferroresonant Voltage Regulators,*. IEEE Std. 449–1990, published by the Institute of Electrical and Electronics Engineers (IEEE) (May 16, 1990).

The UPS system 100 also includes a voltage regulator 105 that includes a transformer input control circuit 120 operative to variably couple input terminals 102a, 102b to the first input winding 112a of the ferroresonant transformer 110 to thereby controllably apply an AC voltage $V_{in}$ received from an AC power source 150, e.g., a utility line, at input terminals 102a, 102b. Specifically, for the illustrated embodiment, the transformer input control circuit 120 includes switches S1, S2 that selectively connect the input terminals 102a, 102b to taps T11, T12, T13, T14 of the first input winding 112a responsive to at least one of an input voltage $V_{in}$ at the terminals 102a, 102b, an output current $I_{out}$ in the output winding 114, an output voltage $V_{out}$ on the output winding 114 and an input current at the terminals 102a, 102b. The transformer input control circuit 120 is also shown including an additional switch Sin that is operative to isolate the input winding 112a from the input terminals 102a, 102b.

Those skilled in the art will appreciate that the input control provided by the transformer input control circuit 120 may be provided by a number of different types circuit elements including, for example, inductors, capacitors, transformers and similar components, as well as relays, mechanical or solid state switches, transistors and other switching and control elements for controlling the connection of the input terminals 102a, 102b to the first input winding 112a. The transformer input control circuit 120 may also include additional digital and/or analog control circuitry including such devices as microcontrollers, microprocessors, operational amplifiers and the like.

An optional resonance control circuit 140 may also be included that controls resonance in the resonant circuit 118 to thereby control saturation characteristics of the output winding 114. The resonance control circuit 140 is coupled to the resonant circuit 118 including the third winding 116 of the transformer 110, and controls resonance in the resonant circuit 118 by, for example, switching additional capacitance C2 in and out of the resonant circuit 118 between taps T21, T22 of the resonant winding 116 using a switch S3. The resonance control circuit 140 acts to vary a saturation characteristic of the output winding 114 to achieve a desired combination of line regulation, load regulation, surge suppression, efficiency and the like, responsive to at least one of the input voltage $V_{in}$, the output current $I_{out}$, the output voltage $V_{out}$, and the input current $I_{in}$.

Those skilled in the art will appreciate that the resonance control provided by the resonance control circuit 140 may be provided by a number of different types of reactive circuits including, for example, inductors, capacitors, transformers and similar components, as well as relays, mechanical or solid state switches, transistors and other switching and control elements for controlling the characteristics of the resonant circuit 118. The resonance control circuit 140 may also include additional digital and/or analog control circuitry including such devices as microcontrollers, microprocessors, operational amplifiers and the like.

Those skilled in the art will appreciate that many of these functional components may be shared by the transformer input control circuit 110 and the resonance control circuit 140. For example, the transformer input control circuit 110 and the resonance control circuit 140 may share a common microprocessor 170 that determines a voltage per turn for the first input winding 112a and a resonance for the resonant circuit 118 that provides a desired combination of line regulation, load regulation, surge suppression, efficiency and other performance characteristics, and which controls the input control switches S1, S2 and the resonance control switch S3 accordingly.

To provide backup power for situations when the input AC voltage provided by the AC power source 150 is degraded, such as during "blackout" or "brownout" conditions, an inverter 130, such as a pulse-width modulated (PWM) inverter, is also provided, connected to the second input winding 112b. DC voltage is supplied to the inverter 130 from a DC power source 160, such as a battery. The DC voltage is converted by the inverter 130 to produce an AC voltage at an output 132 of the inverter 130 that is applied to the second input winding 112b. As described above, when the inverter 130 is operational, the transformer input control circuit 120 may isolate the AC voltage supplied at the input terminals 102a, 102b from the first input winding 112a, for example, by opening the input control switch Sin.

The inverter 130 may comprise any of a number of conventional inverter circuits well known to those skilled in the art. For example, the inverter may comprise a pulse-width-modulated (PWM) inverter that produced a "pulsed" AC signal having a duty cycle that is varied to control the effective AC voltage applied at the second input winding 112b. The inverter 130 preferably produces a regulated AC voltage at its output 132 that is maintained within a predetermined voltage range. By using a regulated inverter, the regulation performance of the UPS system 100 can be maintained when the system 100 is operating on power supplied by the inverter 130. However, those skilled in the art will appreciate that a "non-regulated" inverter, such as an open-loop regulator lacking pulse width or similar control, may be used with the present invention, but may provide poorer performance.

Figure 2:
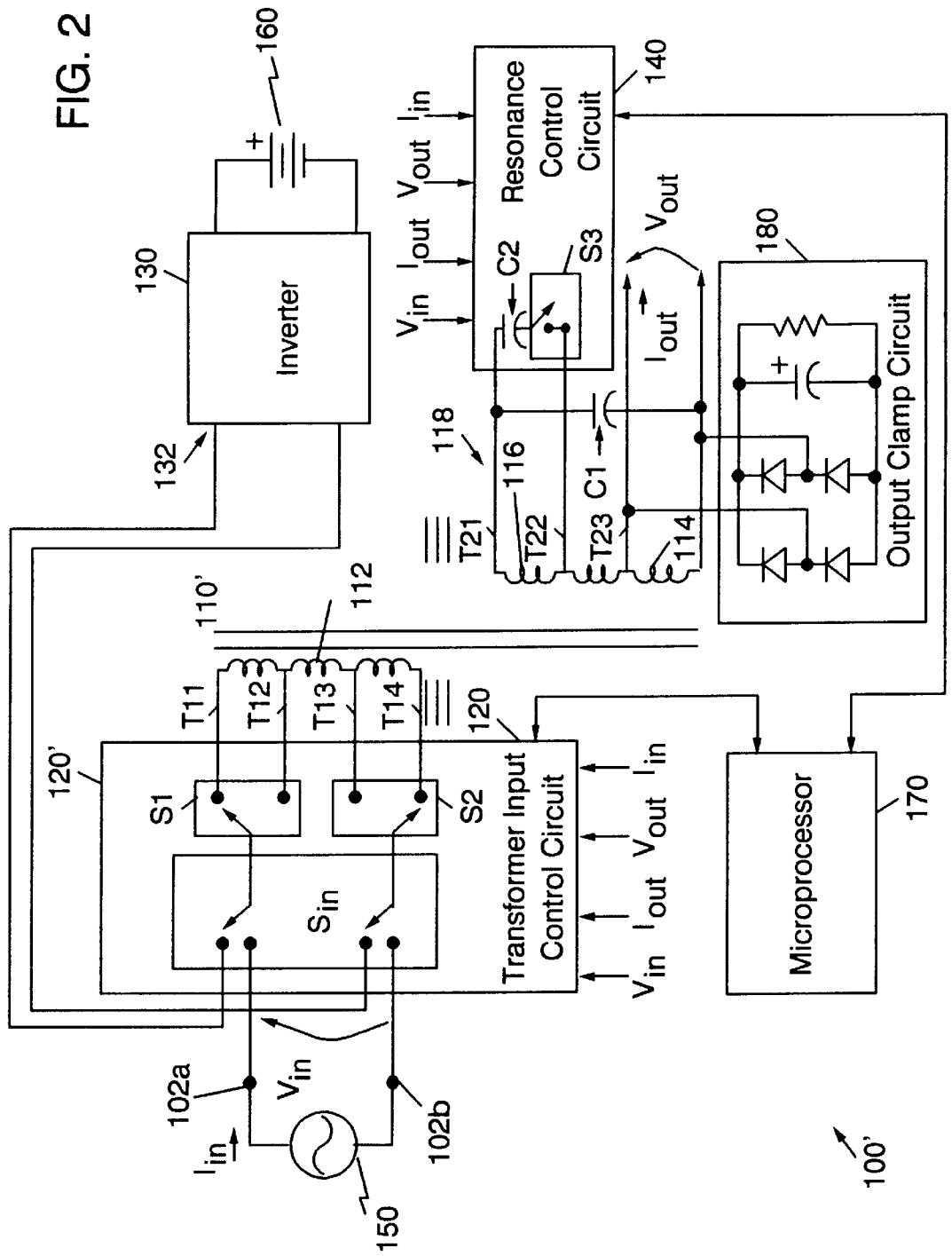
FIG. 2 illustrates a second UPS system embodiment of the present invention.

Those skilled in the art will also appreciate that configurations of the inverter 130 and the transformer input control circuit 120 other than that illustrated in FIG. 1 also fall within the scope of the present invention. For example, FIG. 2 illustrates an alternative embodiment 100' in which a transformer input control circuit 120' is further operative to connect one of an AC power source 150 and an inverter 130 to a single input winding 112 of a ferroresonant transformer 110'. For example, an input control switch Sin' may be provided that switches the input winding 112 between the input terminals 102a, 102b and the output 132 of the inverter 130.

Returning to FIG. 1, those skilled in the art will appreciate that the interaction of the inverter 130 and the AC power source 150 may occur in a number of different ways. For example, the inverter 130 may operate purely in a "standby/online" mode, i.e., a control scheme wherein the AC power supply 150 is isolated from the first input winding 112a by the input control switch Sin when the inverter 130 is supplying AC voltage to the second input winding 112b and the inverter output 132 is de-energized when the AC power supply 150 is connected to the first input winding 112a. Alternatively, the inverter 130 may operate in a "line-interactive" or "tri-port" mode wherein the inverter 130 applies an AC voltage to the second input winding 112b concurrently with the application of the AC power source 150 to the first input winding 112a. Under such an operational scheme, for example, the inverter 130 may act to compensate fluctuations in AC voltage provided by the AC power source 150 to maintain a desired quality in the output voltage $V_{out}$.

Those skilled in the art will appreciate that communications preferably are provided between the inverter 130, the transformer input control circuit 120 and the resonance control circuit 140 to properly synchronize application of power from the inverter 130. For example, a communications bus or similar data path may be provided between the microprocessor 170 and the inverter 130 to enable the microprocessor 170 to synchronize operation of the inverter 130, the transformer input control circuit 120 and the resonance control circuit 140. To provide additional protection of downstream elements and equipment, an output clamp circuit 180 may also be provided to suppress intermittent voltage excursions that otherwise might cause problems in the downstream elements and equipment and unnecessarily reduce their operational lifetimes.

The present invention arises from the realization that by controlling the voltage per turn applied to the input winding of a ferroresonant transformer circuit and, optionally, the resonance in the resonant circuit of the ferroresonant transformer circuit, the saturation characteristics of the ferroresonant transformer circuit can be varied to vary its operational envelope. In particular, the transformer input control circuit 120 and the resonance control circuit 140 described above act to control the circulating current in the resonant circuit 118, and accordingly, the saturation characteristic of the ferroresonant transformer circuit.

Conventional ferroresonant transformer regulators typically have resonant components, e.g., transformer windings and resonating capacitors, that have component values that are typically chosen such that circulating volt amperes in the resonant circuit runs on the order of two to four times the rated output power of the regulator within the nominal operational envelope of the regulator. These component values typically are chosen out of a desire to achieve a particular regulation performance over the rated line input and load range of the regulator; maintaining a minimum circulating volt amperes in the resonant circuit ensures that the regulator is maintained in saturation at its rated output current. Among the downsides to this approach is relatively low efficiency at nominal output currents, and a tendency to require bulky, and typically expensive, components, such as large resonating capacitors and ferroresonant transformers with substantial resonant windings.

According to aspects of the present invention, voltage per turn on the input winding is controlled, thus reducing the requirement for the resonant circuit to regulate over a large range of primary winding voltages. This input control reduces the regulation burden on the ferroresonant transformer circuit, allowing the ferroresonant transformer circuit to be designed to operate over a more constrained operational envelope using a resonant circuit that supports smaller circulating currents. Accordingly, the ferroresonant transformer and associated components can be made smaller, lighter and, presumably, less expensive than a comparable conventional ferroresonant transformer regulator having a comparable powerhandling capability. In addition, increased efficiency can be achieved because appropriate input control (and, optionally, resonance control) can maintain the ferroresonant transformer circuit at an optimal or near optimal saturation characteristic over its entire operating range.

FIGS. 3–7 illustrate exemplary control structures and operations that may be implemented using the apparatus of FIGS. 1 and 2. Those skilled in the art will appreciate that the structures and operations illustrated in FIGS. 3–7 can be implemented by computer program instructions which may be loaded onto a computer or other programmable data processing apparatus to produce a machine such that the instructions which execute on the computer or other programmable data processing apparatus create means for implementing the functions specified in the flowchart block or blocks. For example, structures and operations of FIGS. 3–7 may be implemented by computer instructions that are loaded and executed by the microprocessor 170 of FIGS. 1 and 2. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the operations specified in FIGS. 3–7. Accordingly, FIGS. 3–7 support combinations of means and combinations of steps for performing the operations specified in FIGS. 3–7. It will also be understood that each structure or operation of FIGS. 3–7 can be implemented by special purpose hardware-based computer systems that perform the specified functions or steps, or combinations of special purpose hardware and computer instructions.

The exemplary structures and operations illustrated in FIGS. 3–7 implement control of voltage per turn on the input winding of a ferroresonant transformer regulator, as well as control of resonance in the resonant circuit of the ferroresonant transformer regulator, based on input voltage $V_{in}$, output current $I_{out}$ and output voltage $V_{out}$. Those skilled in the art will appreciate that these exemplary structures and operations are provided for illustrative purposes, and do not limit the scope of the invention to the illustrated structures and operations of FIGS. 3–7. For example, input and resonance control based on input current $I_{in}$ (as illustrated in FIGS. 1 and 2) or other operational parameters of the regulator 105 may also be provided within the scope of the present invention.

Figure 3:
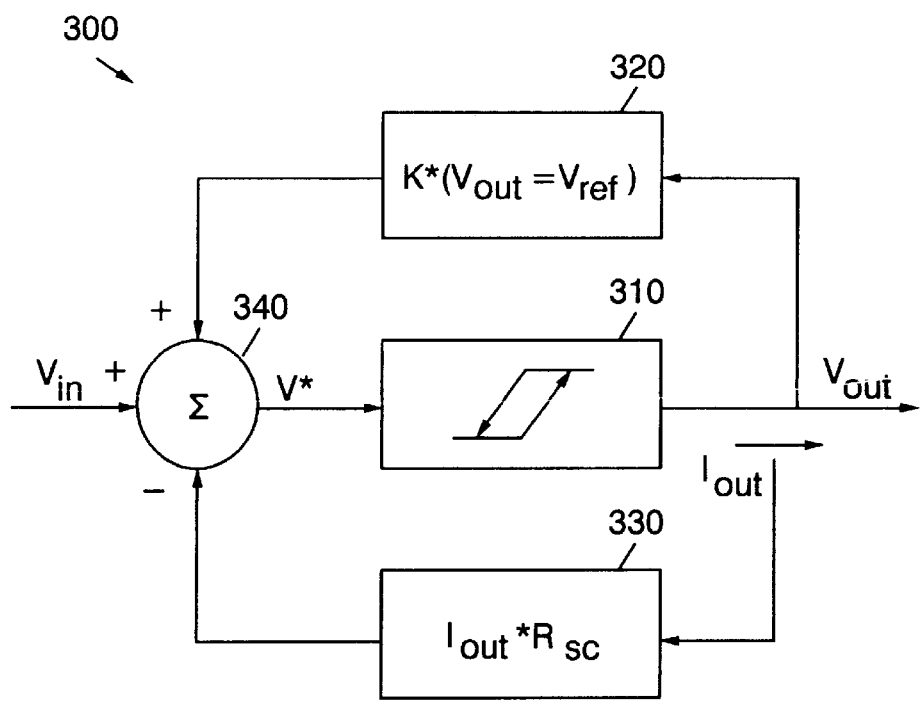
FIG. 3 illustrates a control structure for controlling voltage per turn on a primary winding according to aspects of the present invention.
Figure 4:
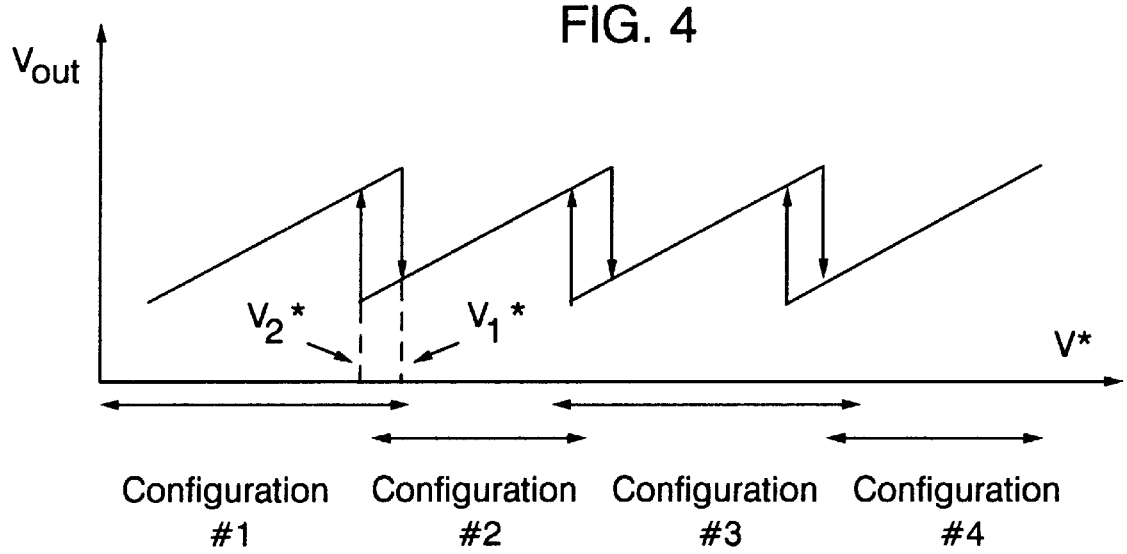
FIG. 4 is a graph illustrating exemplary control operation for the embodiment of FIG. 3.

FIG. 3 illustrates an exemplary transformer input control structure 300 for controlling a ferroresonant transformer voltage regulator such as the regulator 105 of FIG. 1. An AC voltage $V_{in}$ is supplied to a summing junction 340, producing a summing junction output $V^*$ that is fed into a hysteresis control block 310. The hysteresis control block 310 selectively connects the input terminals 102a, 102b of the regulator 105 using the switches S1, S2 based on the summing junction output $V^*$, introducing hysteresis by switching tap configurations at respective upper and lower thresholds $V_1^*$, $V_2^*$ depending on whether the summing junction output $V^*$ is increasing or decreasing, as illustrated by the graph of FIG. 4. The switches S1, S2 illustrated in FIG. 1 support four tap configurations, corresponding to the four possible permutations of the switches S1, S2.

Figure 5:
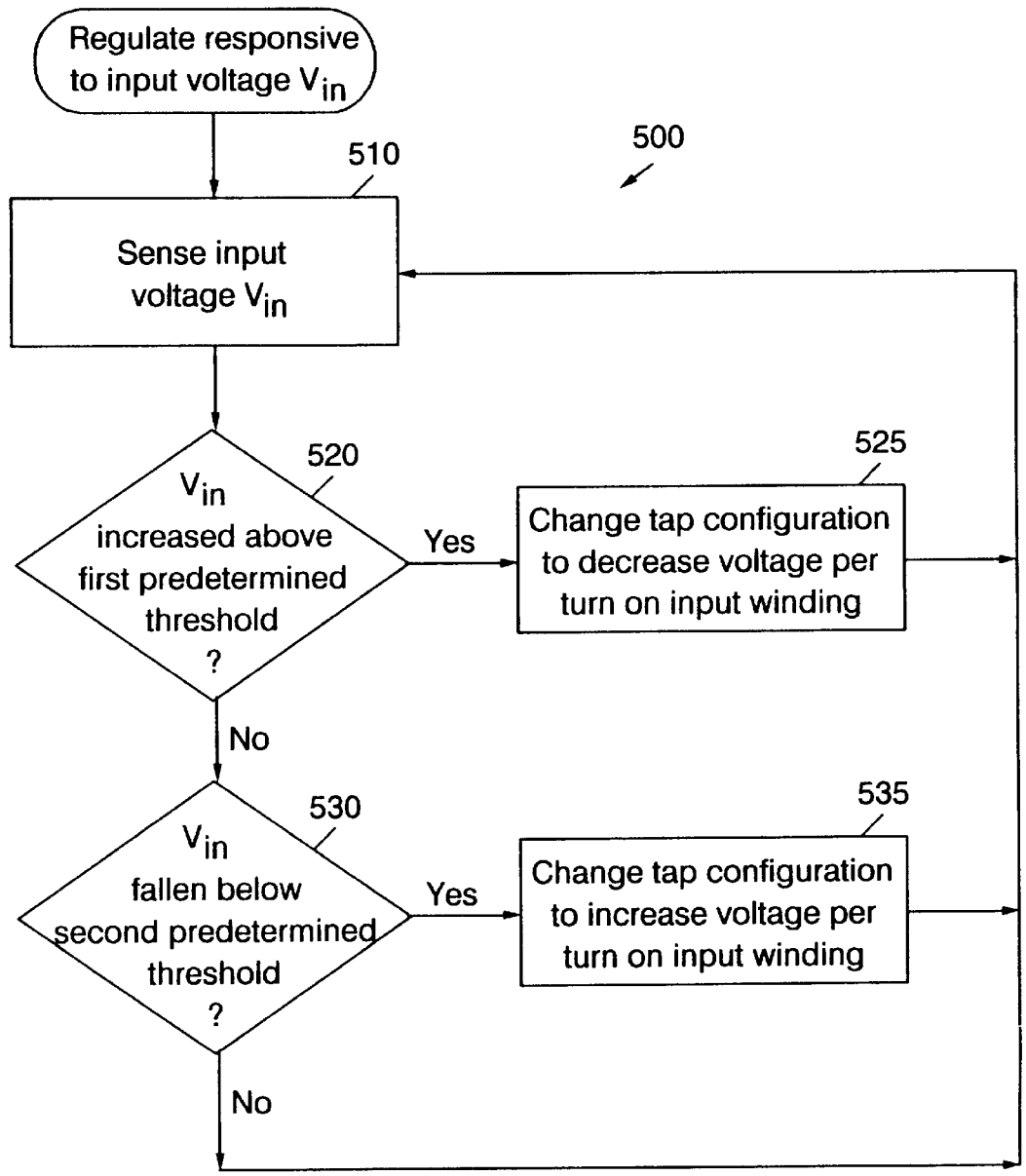
FIG. 5 is a flowchart illustrating exemplary operations for controlling voltage per turn on a primary winding responsive to input voltage according to an aspect of the present invention.

FIG. 5 illustrates voltage regulation operations 500 that can be implemented by the structure 300 of FIG. 3. The input voltage $V_{in}$ is sensed (Block 520). If the input voltage $V_{in}$ has increased above a first predetermined threshold (Block 520), the tap configuration is changed to decrease the voltage per turn on the input winding of the ferroresonant transformer voltage regulator (Block 525). If the input voltage $V_{in}$ has fallen below a second predetermined threshold less than the first predetermined threshold (Block 530), the tap configuration is changed to increase the voltage per turn on the input winding of the ferroresonant transformer voltage regulator (Block 535).

Returning to FIG. 3, control other than that based on the applied AC voltage can be achieved by providing a first feedback path 330 that feeds a signal $I_{out}^* R_{sc}$ that is representative of the output current $I_{out}$ into the summing junction 340. When the output current $I_{out}$ decreases to the point of causing the summing junction output $V^*$ to increase above a first predetermined threshold, the hysteresis controller 310 changes tap configurations to decrease the voltage per turn on the input winding of the ferroresonant transformer regulator. When the output current $I_{out}$ increases to the point of causing the summing junction output $V^*$ to decrease below a second predetermined threshold, the hysteresis controller 310 changes tap configurations to increase the voltage per turn on the input winding of the ferroresonant transformer voltage regulator.

Output voltage based control may also be provided. A second feedback path 320 supplies a signal $K^*(V_{out}-V_{ref})$ representing a difference between the actual output voltage $V_{out}$ and a desired output voltage $V_{ref}$ to the summing junction 340. When the output voltage $V_{out}$ increases above the desired voltage $V_{ref}$ to the point of causing the summing junction output $V^*$ to increase past a first predetermined threshold, the hysteresis controller 310 changes the tap configuration to provide a reduced voltage per turn on the input winding of the ferroresonant transformer regulator. When the output voltage $V_{out}$ decreases below the desired output voltage $V_{ref}$ to the point of causing the summing junction output $V^*$ to decrease below a second predetermined threshold, the hysteresis controller 310 increases the voltage per turn on the input winding of the ferroresonant transformer regulator.

The hysteresis controller 310, feedback paths 320, 330 and summing junction 340 of the control structure 300 of FIG. 3 may be implemented using, for example, the apparatus of FIGS. 1 or 2. F or example, the summing junction 340 and the hysteresis controller 310 may be implemented by a computer program running on the microprocessor 170 of FIG. 1, or by similarly functioning analog and/or digital circuitry. Similarly, scaling and other functions of the feedback paths 320, 330 may be implemented in a microprocessor or similarly functioning analog and/or digital circuitry. Other functions, e.g., current and voltage sensing, may be performed by a wide variety of components known to those skilled in the art, such as voltage sampling devices, current sense resistors, current transformers, analog-to-digital converters (A/Ds), and the like.

Those skilled in the art will also appreciate that transformer input control structures other than the structure 300 of FIG. 3 may be used with the present invention. For example, the linear feedback structure illustrated in FIG. 3 could be replaced by a more generalized control structure that implements some of the linear control functions indicated in FIG. 3 within a certain operational envelope, and that implements other, perhaps nonlinear, control functions within another operational envelope. For example, it may be desirable to implement a hard limit input voltage per turn on the input winding of the ferroresonant transformer regulator under output current $I_{out}$ and output voltage $V_{out}$ conditions that indicate a short circuit, or to vary the gains K, $R_{sc}$ associated with the feedback paths 320, 330 over a range of input voltages, output voltages and/or output currents to compensate for nonlinearities in the performance characteristics of the ferroresonant transformer regulator. It will also be understood that rule-based, fuzzy logic, neural network or other control architectures may be used in place of an algebraic control structure such as that illustrated in FIG. 3.

Figure 6:
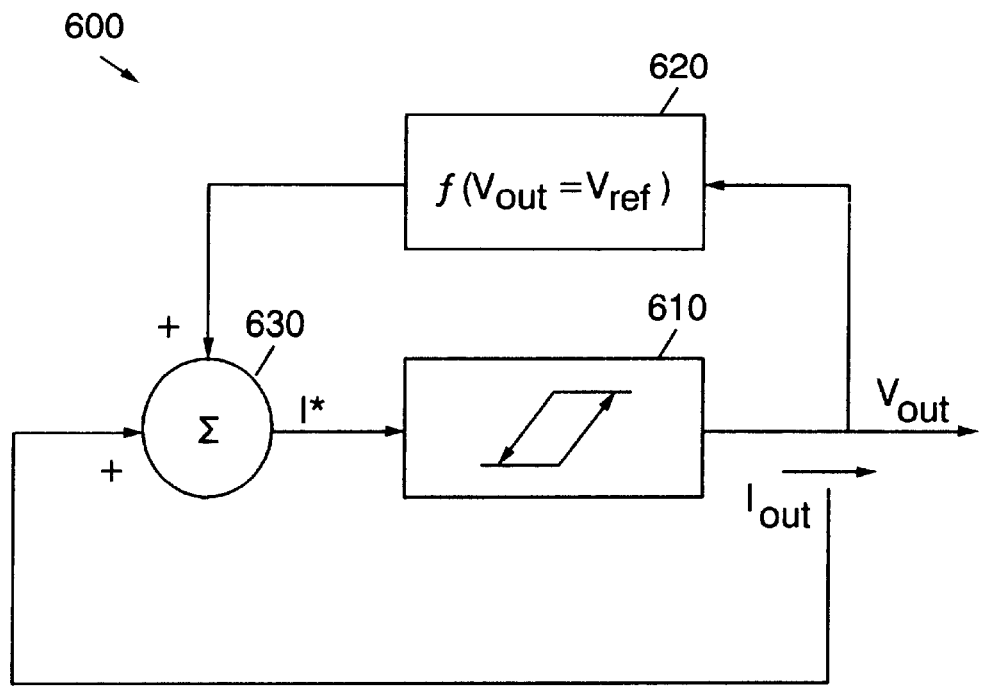
FIG. 6 illustrates a control structure for controlling resonance in a ferroresonant transformer circuit according to aspects of the present invention.
Figure 7:
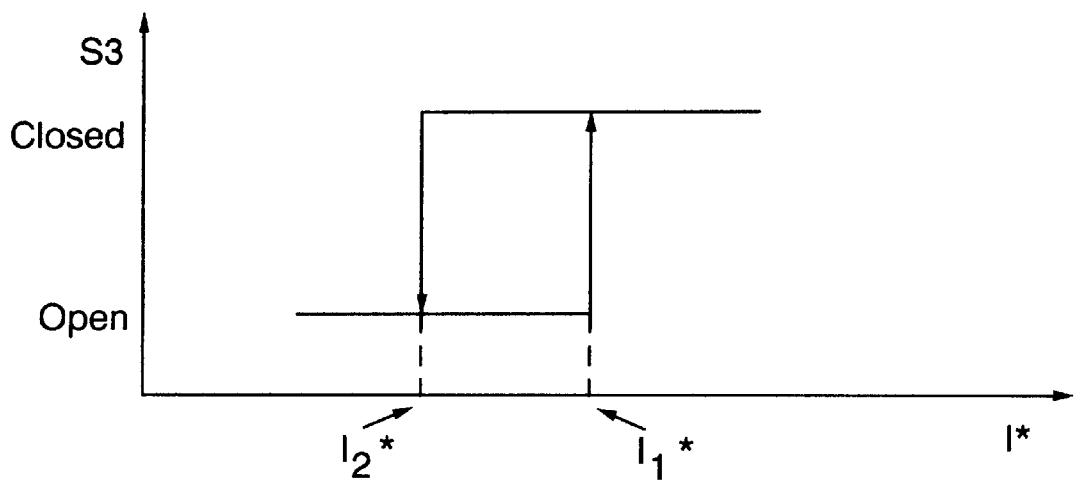
FIG. 7 is a graph illustrating exemplary resonance control for the embodiment of FIG. 6.

FIG. 6 illustrates an exemplary resonance control structure 600 that can be implemented by the voltage regulator 105 of FIG. 1, in particular, by the resonance control circuit 140. The output current $I_{out}$ of a ferroresonant transformer regulator is fed into a summing junction 630, producing a summing junction output $I^*$ that is then fed into a hysteresis controller 610. The hysteresis controller 160 (implemented, for example, in the microprocessor 170 of FIG. 1) changes the state of the switch S3 of the resonance control circuit 140 to switch the additional capacitor C2 in and out of the resonant circuit 118. As illustrated in FIG. 7, when the output current $I_{out}$ increases to the point that the summing junction output $I^*$ increases above a first predetermined threshold $I_1^*$, the switch S3 is closed, adding the additional capacitance C2 to the resonant circuit 118. When the output current $I_{out}$ decreases such that the summing junction output $I^*$ falls below a second predetermined threshold $I_2^*$, the switch S3 is opened, removing the additional capacitance C2 from the resonant circuit 118.

Output voltage based resonance control may also be implemented. A voltage feedback path 620 may be provided that feeds a signal $f(V_{out}-V_{ref})$ that represents a difference between the actual output voltage $V_{out}$ and a desired output voltage $V_{ref}$ into the summing junction 630, where it is added to the output current signal $I_{out}$. It will be understood that, in general, the signal $f(V_{out}-Vref)$ may represent any number of functions of the output voltage $V_{out}$, including linear and nonlinear functions.

The hysteresis controller 610, feedback path 620 and summing junction 630 of the control structure 600 of FIG. 6 may be implemented using, for example, the apparatus of FIGS. 1 and 2. For example, the summing junction 630 and the hysteresis controller 610 may be implemented by a computer program running on the microprocessor 170 of FIG. 1, or by similarly functioning analog and/or digital circuitry. Similarly, scaling and other functions of the feedback path 620 may be implemented in a microprocessor or similarly functioning analog and/or digital circuitry. Other functions, e.g., current and voltage sensing, may be performed by a wide variety of components known to those skilled in the art, such as voltage sampling devices, current sense resistors, current transformers, analog-to-digital converters (A/Ds), and the like.

Those skilled in the art will also appreciate that resonance control structures other than the structure 600 of FIG. 6 may be used with the present invention. For example, the regulator could use a more generalized resonant control structure that implements some of the control functions indicated in FIG. 6 within a certain operational envelope, and that implements other control functions within another operational envelope. Those skilled in the art will appreciate that rule-based, fuzzy logic, neural network or other control architectures may also be used in place of an algebraic control structure such as that illustrated in FIG. 6.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An uninterruptible power supply system for producing an AC voltage from at least one of a DC power source and an AC power source, the system comprising:
   an input terminal configured to receive an AC voltage from an AC power source;
   an inverter operative to produce an AC voltage at an output thereof from a DC power source;
   a ferroresonant transformer circuit including a transformer having an input winding, an output winding, and a third winding that forms part of a resonant circuit that produces saturation in said output winding when an AC voltage on the input winding exceeds a predetermined amplitude; and
   a transformer input control circuit coupled to said input terminal and to said inverter output and operative to couple said input terminal and/or said inverter output to said input winding, said transformer input control circuit operative to regulate a circulating current in said resonant circuit by variably coupling said input terminal to said input winding responsive to a control input.

2. A system according to claim 1, wherein said transformer input control circuit is operative to increase a voltage per turn on said input winding responsive to at least one of an increase in a current in said output winding, a decrease in a voltage at said input terminal, and a decrease in a voltage on said output winding and to decrease a voltage per turn on said input winding responsive to at least one of a decrease in a current in said output winding, an increase in a voltage at said input terminal, and an increase in a voltage on said output winding.

3. A system according to claim 2, wherein said transformer input control circuit is operative to increase a voltage per turn on said input winding responsive to a current in said output winding increasing above a first predetermined threshold and to decrease a voltage per turn on said input winding responsive to a current in said output winding falling below a second predetermined threshold.

4. A system according to claim 2, wherein said transformer input control circuit is operative to decrease a voltage per turn on said input winding responsive to a voltage at said input terminal increasing above a first predetermined threshold and to increase a voltage per turn on said input winding responsive to a voltage at said input terminal falling below a second predetermined threshold.

5. A system according to claim 2, wherein said transformer input control circuit is operative to decrease a voltage per turn on said input winding responsive to a voltage on said output winding increasing above a first predetermined threshold and to increase a voltage per turn on said input winding responsive to a voltage on said output winding falling below a second predetermined threshold.

6. A system according to claim 1, wherein said transformer input control circuit is operative to connect said input terminal to said input winding at a location along said input winding selected responsive to at least one of a voltage at said input terminal, a current in said output winding, a voltage on said output winding and a current at said input terminal.

7. A system according to claim 6:
   wherein said input winding has a plurality of taps; and
   wherein said transformer input control circuit is operative to connect said input terminal to a selected one of said plurality of taps responsive to at least one of a voltage at said input terminal, a current in said output winding, a voltage on said output winding, and a current at said input terminal.

8. A system according to claim 7, wherein said transformer input control circuit comprises a switch operative to connect said input terminal to a selected one of said plurality of taps.

9. A system according to claim 1, further comprising a resonance control circuit coupled to said third winding and operative to control a resonance of said resonant circuit to thereby control a saturation characteristic of said output winding.

10. A system according to claim 9, wherein said resonance control circuit comprises means for increasing, and decreasing capacitance in said resonant circuit.

11. A system according to claim 1, wherein said transformer input control circuit is operative to control a voltage per turn on said input winding to optimize at least one of a surge suppression characteristic, a short circuit current, an efficiency, a line regulation and a load regulation responsive to at least one of a voltage at said input terminal, a current in said output winding, a voltage in said output winding and a current at said input terminal.

12. A system according to claim 7, wherein said transformer input control circuit and said resonance control circuit are operative to control a voltage per turn on said input winding and a resonance of said resonant circuit, respectively, to optimize at least one of a surge suppression characteristic, a short circuit current, an efficiency, a line regulation and a load regulation responsive to at least one of a voltage at said input terminal, a current in said output winding, a voltage on said output winding, and a current at said input terminal.

13. A system according to claim 1, wherein said transformer input circuit is operative to couple a selected one of an AC power supply connected at said input terminal or said inverter output to said input winding.

14. A system according to claim 1:
   wherein said input winding comprises a first input winding and a second input winding;
   wherein said transformer input control circuit is operative to variably couple said input terminal to said first input winding responsive to at least one of a voltage at said input terminal and a current in said output winding; and
   wherein said inverter output is coupled to said second input winding.

15. A system according to claim 14, wherein said inverter is operative to produce a regulated AC voltage at said inverter output that is maintained within a predetermined voltage range.

16. A system according to claim 1, in combination with a DC power source connected to said inverter.

17. A voltage regulator, comprising:
   an input terminal configured to receive an input AC voltage;

a ferroresonant transformer circuit including a transformer having an input winding, an output winding and a third winding, that forms part of a resonant circuit that produces saturation in said output winding when an AC voltage on said input winding exceeds a predetermined amplitude; and a transformer input control circuit coupled to said input terminal and operative to regulate a circulating current in said resonant circuit by variably coupling said input terminal to said input winding responsive to a control input.

18. A voltage regulator according to claim 17, wherein said transformer input control circuit is operative to variably couple said input terminal to said input winding responsive to at least one of a voltage at said input terminal, a current in said output winding, a voltage on said output winding, and a current at said input terminal.

19. A voltage regulator according to claim 18, wherein said transformer input control circuit is operative to increase a voltage per turn on said input winding responsive to at least one of an increase in a current in said output winding, a decrease in a voltage at said input terminal, and a decrease in a voltage on said output winding, and to decrease a voltage per turn on said input winding responsive to at least one of a decrease in a current in said output winding, an increase in a voltage at said input terminal, and an increase in a voltage on said output winding.

20. A voltage regulator according to claim 19, wherein said transformer input control circuit is operative to increase a voltage per turn on said input winding responsive to a current in said output winding increasing above a first predetermined threshold and to decrease a voltage per turn on said input winding responsive to a current in said output winding falling below a second predetermined threshold.

21. A voltage regulator according to claim 19, wherein said transformer input control circuit is operative to decrease a voltage per turn on said input winding responsive to a voltage at said input terminal increasing above a first predetermined threshold and to increase a voltage per turn on said input winding responsive to a voltage at said input terminal falling below a second predetermined threshold.

22. A voltage regulator according to claim 19, wherein said transformer input control circuit is operative to decrease a voltage per turn on said input winding responsive to a voltage on said output winding increasing above a first predetermined threshold and to increase a voltage per turn on said input winding responsive to a voltage on said output winding falling below a second predetermined threshold.

23. A voltage regulator according to claim 18, wherein said transformer input control circuit is operative to connect said input terminal to said input winding at a location along said input winding selected responsive to at least one of a voltage at said input terminal, a current in said output winding, a voltage on said output winding, and a current at said input terminal.

24. A voltage regulator according to claim 23:

wherein said input winding has a plurality of taps; and wherein said transformer input control circuit is operative to connect said input terminal to a selected one of said plurality of taps responsive to at least one of a voltage at said input terminal, a current in said input winding, a voltage on said output winding, and a current at said input terminal.

25. A voltage regulator according to claim 24, wherein said transformer control circuit comprises a switch operative to connect said input terminal to a selected one of said plurality of taps.

26. A voltage regulator according to claim 18, further comprising a resonance control circuit coupled to said third winding and operative control a resonance of said resonant circuit to thereby control a saturation characteristic of said output winding.

27. A voltage regulator according to claim 26, wherein said resonance control circuit comprises means for increasing and decreasing capacitance in said resonant circuit.

28. A voltage regulator according to claim 18, wherein said transformer input control circuit is operative to control a voltage per turn on said input winding to optimize at least one of a surge suppression characteristic, a short circuit current, an efficiency, a line regulation and a load regulation responsive to at least one of a voltage at said input terminal, a current in said output winding, a voltage on said output winding and a current at said input terminal.

29. A voltage regulator according to claim 26, wherein said transformer input control circuit and said resonance control circuit are operative to control a voltage per turn on said input winding and a resonance of said resonant circuit to optimize at least one of a surge suppression characteristic, a short circuit current, an efficiency, a line regulation and a load regulation of said voltage regulator responsive to at least one of a voltage at said input terminal, a current in said output winding, a voltage on said output winding, and a current at said input terminal.

30. A method of operating a ferroresonant transformer circuit including a transformer having an input winding, an output winding and a third winding that forms part of a resonant circuit that produces saturation in the output winding when an AC voltage on the input winding exceeds a predetermined amplitude, the method comprising the step of:

variably coupling an AC voltage source to the input winding responsive to a control input to thereby regulate a circulating current in the resonant circuit.

31. A method according to claim 30, wherein said step of variably coupling comprises the step of variably coupling an AC voltage to the input winding responsive to at least one of a voltage at the AC voltage source, a current in the output winding, a voltage on the output winding, and a current at the AC voltage source.

32. A method according to claim 31, wherein said step to variably coupling comprises the step of connecting an input terminal connected to the AC voltage source to the input winding at a selected location along the input winding.

33. A method according to claim 32, wherein the input winding has a plurality of taps, and wherein said step of connecting comprises the step of connecting the input terminal to a selected one of the plurality of taps.

34. A method according to claim 33, wherein said step of connecting comprises the steps of:

connecting the input terminal to a tap that increases a voltage per turn on the input winding, in response to a current in the output winding exceeding a first predetermined threshold; and connecting the input terminal to a tap that decreases a voltage per turn on the input winding, in response to a current in the output winding falling below a second predetermined threshold.

35. A method according to claim 33, wherein said step of connecting comprises the steps of:

connecting the input terminal to a tap that decreases the number of turns of the input winding across which an AC voltage received at the input terminal is applied, in response to a decrease in an AC voltage received at the input terminal; and connecting the input terminal to a tap that increases the number of turns of the input winding across which an AC voltage received at the input terminal is applied, in response to an increase in an AC voltage received at the input terminal.

36. A method according to claim 33, wherein said step of connecting comprises the steps of:

connecting the input terminal to a tap that decreases the number of turns of the input winding across which an AC voltage received at the input terminal is applied, in response to a decrease in a voltage on the output winding; and connecting the input terminal to a tap that increases the number of turns of the input winding across which an AC voltage received at the input terminal is applied, in response to an increase in a voltage on the output winding.

37. A method according to claim 32, further comprising the step of varying a resonance of the resonant circuit to thereby control a saturation characteristic of the output winding.

38. A method according to claim 32, comprising the step of variably coupling the input terminal to the input winding to thereby optimize at least one of a surge suppression characteristic, a short circuit current, an efficiency, a line regulation and a load regulation.

39. A method according to claim 37, comprising the step of variably coupling the input terminal to the input winding and controlling resonance in the resonant circuit to thereby optimize at least one of a surge suppression characteristic, a short circuit current, an efficiency, a line regulation and a load regulation.

40. A system according to claim 1, wherein the control input comprises an operating parameter of the system.

41. A system according to claim 1, wherein the control input comprises at least one of a voltage at said input terminal, a current in said output winding, a voltage on said output winding and a current at said input terminal.

42. A voltage regulator according to claim 17, wherein the control input comprises an operating parameter of the voltage regulator.

43. An uninterruptible power supply system comprising:

an input terminal configured to receive an AC voltage from an AC power source;

an AC voltage generating circuit configured to receive a DC voltage from a DC power source and operative to produce an AC voltage therefrom;

a ferroresonant transformer circuit including a transformer having an input winding and output winding; and a transformer input control circuit coupled to said input terminal and to the AC voltage generating circuit and operative to couple said input terminal and/or said AC voltage generating circuit to said input winding, said transformer input control circuit operative to variably couple said input terminal to said input winding responsive to a control input.

44. A system according to claim 43, wherein the control input comprises an operating parameter of the system.

45. A system according to claim 43, wherein the control input comprises at least one of a voltage at said input terminal, a current in said output winding, a voltage on said output winding and a current at said input terminal.

46. A system according to claim 43, wherein the transformer input control circuit is operative to connect said input terminal to said input winding at a location along said input winding that is selected responsive to the control input.

47. A system according to claim 43, wherein the input winding comprises a plurality of taps, and wherein the transformer input control circuit is operative to connect the input terminal to a selected one of the plurality of taps responsive to the control input.

48. A system according to claim 43, wherein the ferroresonant transformer circuit comprises a resonant circuit magnetically coupled to the input winding and the output winding, and wherein the transformer input control circuit is operative to regulate a circulating current in the resonant circuit responsive to the control input.

49. A system according to claim 48, further comprising a resonance control circuit operative to control a resonance of the resonant circuit.

50. A system according to claim 49, wherein the resonance control circuit is operative to increase and decrease a capacitance in the resonant circuit.

51. A system according to claim 50, wherein the resonance control circuit comprises:

a capacitor; and a control circuit operative to couple and decouple the capacitor to and from the resonant circuit.

52. A system according to claim 43, wherein the AC voltage generating circuit comprises an inverter.

53. A voltage regulator, comprising:

an input terminal configured to receive an input AC voltage;

a ferroresonant transformer circuit including a transformer having an input winding and an output winding; and a transformer input control circuit coupled to said input terminal and operative to variably couple said input terminal to said input winding responsive to a control input.

54. A voltage regulator according to claim 53, wherein the control input comprises an operating parameter of the system.

55. A voltage regulator according to claim 53, wherein the control input comprises at least one of a voltage at said input terminal, a current in said output winding, a voltage on said output winding and a current at said input terminal.

56. A voltage regulator according to claim 53, wherein the transformer input control circuit is operative to connect said input terminal to said input winding at a location along said input winding that is selected responsive to the control input.

57. A voltage regulator according to claim 56, wherein the input winding comprises a plurality of taps, and wherein the transformer input control circuit is operative to connect the input terminal to a selected one of the plurality of taps responsive to the control input.

58. A voltage regulator according to claim 53, wherein the ferroresonant transformer circuit comprises a resonant circuit magnetically coupled to the input winding and the output winding, and wherein the transformer input control circuit is operative to regulate a circulating current in the resonant circuit responsive to the control input.

59. A voltage regulator according to claim 58, further comprising a resonance control circuit operative to control a resonance of the resonant circuit.

60. A voltage regulator according to claim 59, wherein the resonance control circuit is operative to increase and decrease a capacitance in the resonant circuit.

61. A voltage regulator according to claim 60, wherein the resonance control circuit comprises:

a capacitor; and a control circuit operative to couple and decouple the capacitor to and from the resonant circuit.

* * * * *

UNITED STATES PATENT AND TRADEMARK OFFICE
CERTIFICATE OF CORRECTION

PATENT NO.    : 6,348,782 B1
DATED         : February 19, 2002
INVENTOR(S)   : Oughton, Jr. et al.

Page 1 of 1

It is certified that error appears in the above-identified patent and that said Letters Patent is hereby corrected as shown below:

<u>Title page,</u>
Item [56], "OTHER PUBLICATIONS", the following references should be added:

-- http://www..alpha.com/php/press./php3?id=3, Alpha Technologies Announces New Cable TV Power Supply," Printed May 3, 2001.

XM Series, Uninterruptible Power Supplies, Technical Manual, XM Series 2-615 Models, XM Series 2-915 Models, 1998, 98 pages.

Operators' & Technical Manual, XM2 Series, Uninterruptible Power Supplies, Effective Date: November, 1999, 6 pages. --

Signed and Sealed this

Third Day of September, 2002

*Attest:*

*Attesting Officer*

JAMES E. ROGAN
*Director of the United States Patent and Trademark Office*